US011943728B2

(12) United States Patent
Gu

(10) Patent No.: US 11,943,728 B2
(45) Date of Patent: Mar. 26, 2024

(54) CLOCK SYNCHRONIZATION FOR HIGH SPEED ASYNCHRONOUS SERIAL INTERFACES

(71) Applicant: BAE SYSTEMS Information and Electronic Systems Integration Inc., Nashua, NH (US)

(72) Inventor: Garry Z Gu, Manalapan, NJ (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 325 days.

(21) Appl. No.: 17/496,017

(22) Filed: Oct. 7, 2021

(65) Prior Publication Data
US 2023/0110448 A1 Apr. 13, 2023

(51) Int. Cl.
H04W 56/00 (2009.01)
(52) U.S. Cl.
CPC .................. *H04W 56/001* (2013.01)
(58) Field of Classification Search
CPC .................................. H04W 56/001
See application file for complete search history.

(56) References Cited

U.S. PATENT DOCUMENTS

| 6,992,984 | B1 | 1/2006 | Gu | |
|---|---|---|---|---|
| 2022/0123849 | A1* | 4/2022 | McCall | .............. H04J 3/0667 |

OTHER PUBLICATIONS

Z. Gu and W.M.Snelgrove, A novel self-calibrating scheme for video-rate 2-step flash analog-to-digital converter, IEEE on Circuit and Systems, 1992.
Z. Gu and W.M.Snelgrove, "Frequency-domain analysis of A/D converter nonlinearity", IEEE on circuit and systems, 1994.
AJ. Gines, EJ Peralias, A. Ruseda, "A review of background calibration systems in pipeline ADCs", Design of Circuits and Integrated Systems Conference, 2002.
B. R. Hamilton, "ACES: Adaptive Clock Estimation and Synchronization using Kalman Filtering", Proceedings of the 14th ACM International Conference on Mobile Computing and Networking, Sep. 2008, pp. 152-162.
Y. Zhao et al., "Self-Adaptive Clock Synchronization for Computational Grid", Journal of Computer Science and Technology, 18, 434-441 (2003).
L. Kleeman and A. Cantoni, "Metastable Behavior in Digital Systems". IEEE Design and Test 4(6), pp. 4-19, Dec. 1987.

* cited by examiner

*Primary Examiner* — Kyaw Z Soe
(74) *Attorney, Agent, or Firm* — KPIP Law, PLLC

(57) ABSTRACT

The system and method for clock synchronization, or calibration, for use in high speed asynchronous serial interfaces. The system and method is automatic, on-line, and occurs in real-time. The process of synchronization may also be started by a user. The calibration scheme is a form of adaptive filtering using 8B10B encoding. Once idle traffic is 8B10B encoded it becomes a stream of K28.5 characters. These characters are used to tune a clock frequency. The process stops, and two devices are synchronized, when the number of idle K28.5 traffic samples are uniformly approximately identical for any of two successive sample intervals.

20 Claims, 9 Drawing Sheets

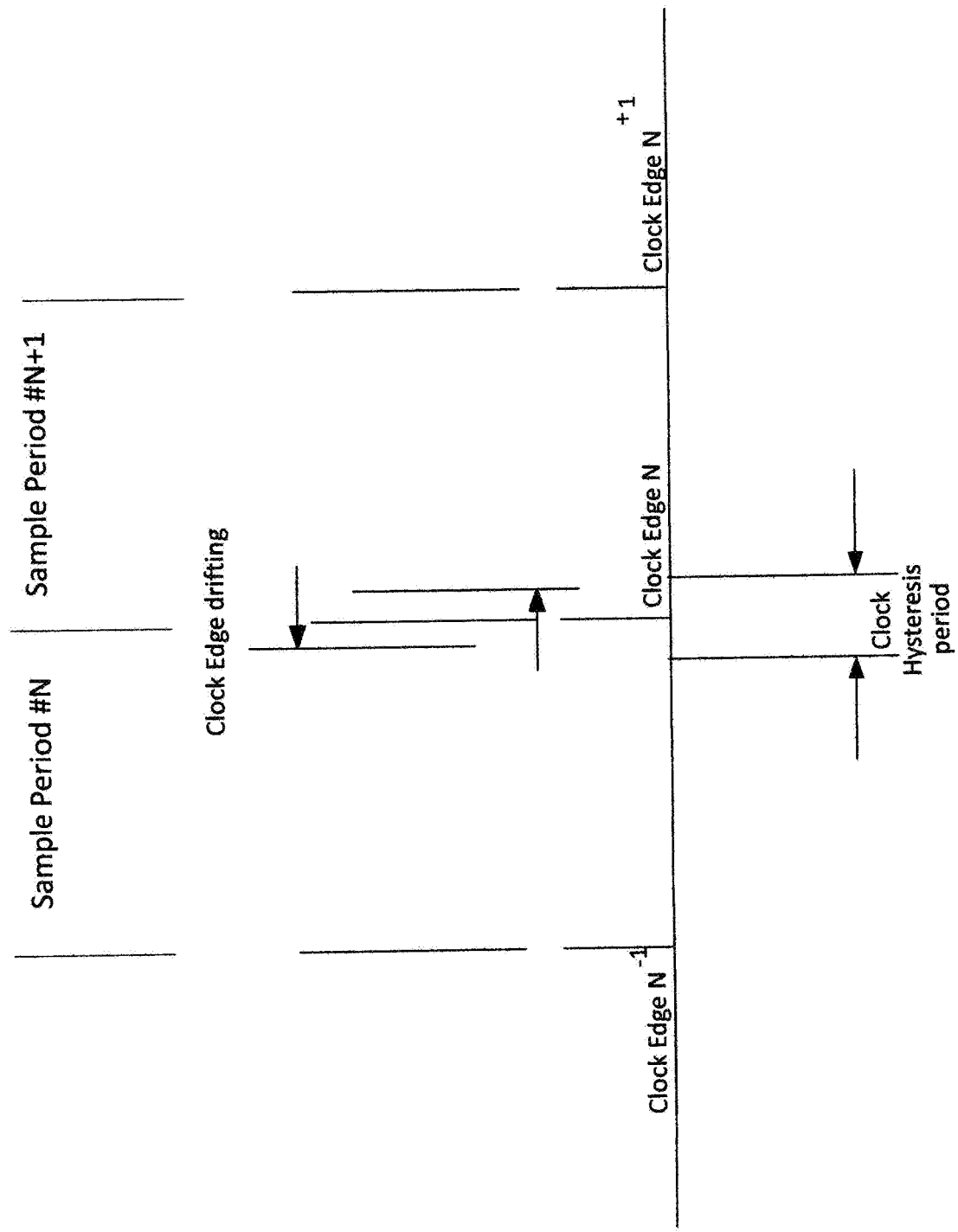

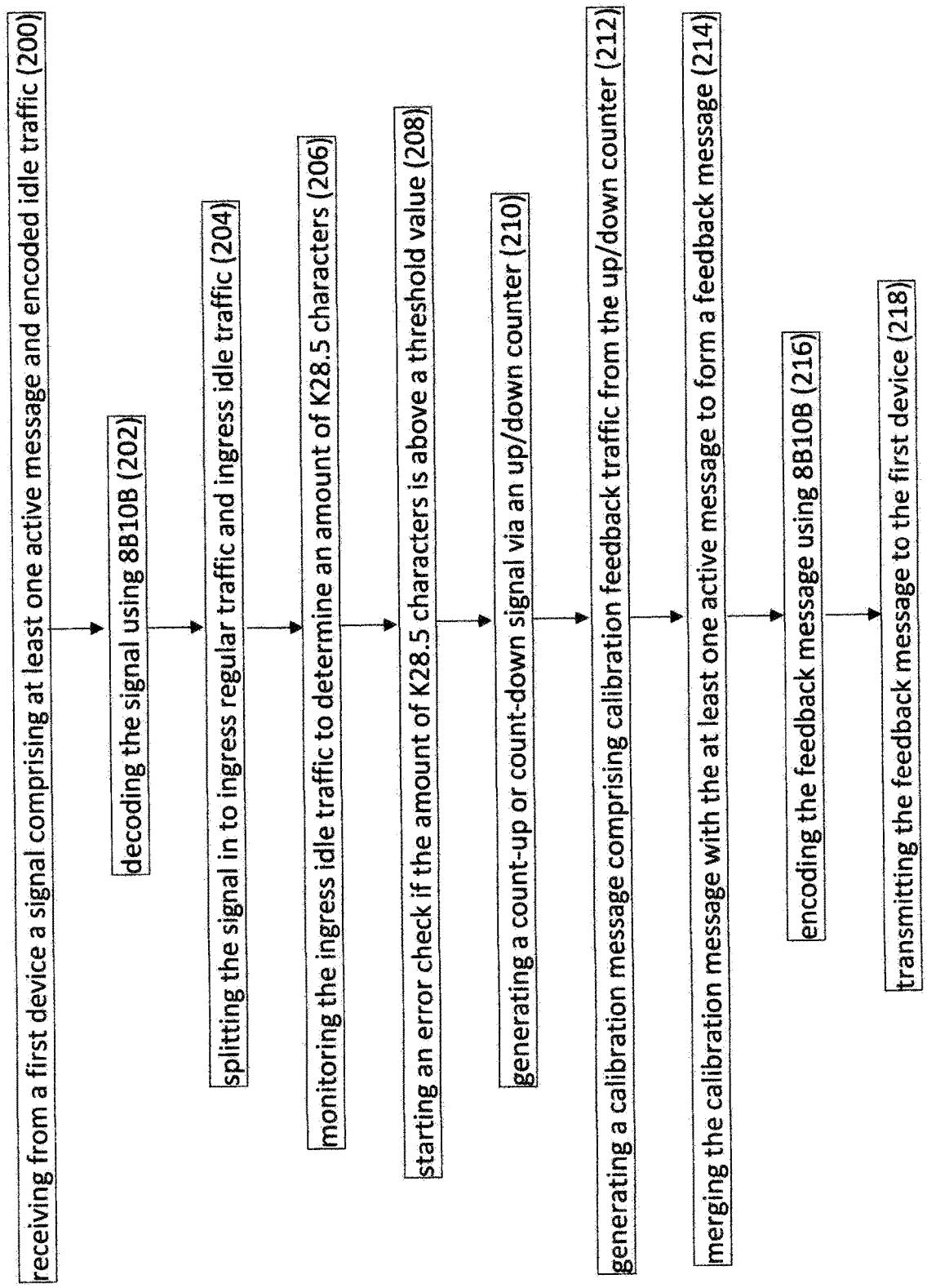

CLOCK SYNCHRONIZATION FOR HIGH SPEED ASYNCHRONOUS SERIAL INTERFACES

FIELD OF THE DISCLOSURE

The present disclosure relates to communication network and more particularly to the use of a unique clock synchronization approach using automatic on-line calibration such that data crossing the physical layers of a communication network retains a low probability of synchronization failure and data loss.

BACKGROUND OF THE DISCLOSURE

A communication coprocessor that provides high-bandwidth, low-latency inter-node communication is a key component of multicomputer systems having numerous computing nodes interconnected by point-to-point links. For high reliability, interdependency between nodes is minimized by using a separate clock at each node. It is understood that system operation must not be dependent on any single node. Thus, the coprocessor must handle asynchronous inputs from each node with very low probabilities of synchronization failures.

In a communication network, each computing node in the system operates with its own clock, and as such, data sent from one node to a neighboring node is not synchronized with the receiver node's clock. In order to process such asynchronous inputs, a synchronous system must first synchronize the various inputs to a local system clock by sampling the input data using, for example, a flip-flop or a latch that is clocked with the local clock. One difference between a latch and a flip-flop is that a latch is level-triggered, where an output can change as soon as the input changes, and a flip-flop is edge-triggered, where it changes state only when a control signal changes (i.e., from high to low or low to high).

Conventional processes can lead to synchronization failure where the flip-flop or latch used for synchronization reaches a metastable state in which its output is a value between logic 0 and logic 1. The failure occurs when the output is interpreted in different parts of the system. As a result of such a failure, the incoming data is NOT received properly. This incorrect data will be passed on to different parts of the system. These different parts could be, for example, a RF section in a command station on the ground, which could then use the wrongly interpreted data and will therefore respond unexpectedly. In one such example, instead of transmitting RF data out to an airplane, the command station might be instructed to wait to receive RF data from an airplane. Thus, pilots sitting in the airplane may receive a data intercept command, but may wonder why no additional data was received as was expected to be transmitted from the ground.

Typically, a communication port must synchronize an input signal and achieve a low probability of synchronization failure so that it doesn't become a major source of unreliability in the system. Environmental changes such as temperature and pressure can also cause frequency drifts to clocks. Moreover, aging can cause the frequency drift, too. This drift typically requires off-line calibration.

Wherefore it is an object of the present disclosure to overcome the above-mentioned shortcomings and drawbacks associated with conventional network synchronization techniques. The present solution is a real-time calibration used to achieve very low probabilities of synchronization failures. This is especially important for mission critical equipment that is remote (e.g., in the field) and unpractical for off-line calibration such as bringing it back to the laboratory to calibrate.

SUMMARY OF THE DISCLOSURE

One aspect of the present disclosure is a method for clock synchronization for use in high speed asynchronous serial interfaces, comprising: on a first device: receiving an ingress traffic from a second device; decoding the ingress traffic using 8B10B; splitting, via a traffic splitter, the ingress traffic in to an ingress regular traffic and a calibration feedback traffic; processing the calibration feedback traffic via a calibration message receiver; tuning a clock frequency based on the calibration feedback; encoding a signal comprising at least one active message and an idle traffic using 8B10B to form a stream of K28.5 characters; transmitting to the second device a signal comprising the encoded at least one active message and the idle traffic with an adjusted frequency; and repeating preceding for a plurality of sample intervals, thereby reducing a probability of data sampling failure for high speed asynchronous serial interfaces.

In some cases, the method is performed without user intervention.

One embodiment of the method for clock synchronization further comprises ending the method when the clock frequency achieves an equilibrium state. In certain embodiments, the equilibrium state occurs when successive sample intervals are almost identical conforming to a nearly uniform probability distribution.

Another embodiment of the method for clock synchronization further comprises pausing the method when there is an insufficient bandwidth to support both the at least one active message and the idle traffic.

Yet another embodiment of the method for clock synchronization is wherein a clock frequency is adjusted to go fast or to go slow (up/down) via a clock phase locked loop (PLL) with a charge pump. In some cases, the charge pump is an electronic integrator which accumulates voltages resulting from small calibration steps.

Another aspect of the present disclosure is a method for clock synchronization for use in high speed asynchronous serial interfaces, comprising: on a second device: receiving a signal from a first device comprising at least one active message and encoded idle traffic from the first device; decoding the signal using 8B10B; splitting, via a traffic splitter, the signal into an ingress regular traffic and an ingress idle traffic; monitoring the ingress idle traffic to determine an amount of K28.5 characters; starting an error check if the amount of K28.5 characters is above a threshold value; generating a count-up or count-down signal via an up/down counter; generating a calibration message comprising a calibration feedback traffic from the up/down counter; merging the calibration message with the at least one active message to form a feedback message; encoding the feedback message using 8B10B; transmitting the feedback message to the first device; and repeating preceding steps for a plurality of sample intervals, thereby reducing a probability of data sampling failure for high speed asynchronous serial interfaces.

In some cases, the method for clock synchronization is performed without user intervention.

One embodiment of the method for clock synchronization further comprises ending the method when the clock frequency achieves an equilibrium state. In certain embodiments, the equilibrium state occurs when successive sample intervals are almost identical conforming to a nearly uniform probability distribution.

Another embodiment of the method for clock synchronization further comprises pausing the method when there is an insufficient bandwidth to support both the at least one active message and the idle traffic.

Yet another embodiment of the method for clock synchronization further comprises ending, on the second device, an error check if active traffic is detected. In some cases, the method for clock synchronization further comprises restarting the error check once the amount of K28.5 characters is above a threshold value.

Yet another aspect of the present disclosure is a method for clock synchronization for use in high speed asynchronous serial interfaces, comprising: receiving, on a first device, an ingress traffic from a second device; decoding, on the first device, the ingress traffic using 8B10B; splitting, via a traffic splitter on the first device, the ingress traffic into an ingress regular traffic and a calibration feedback traffic; processing, on the first device, the calibration feedback traffic via a calibration message receiver; tuning, on the first device, a clock frequency based on the calibration feedback traffic; encoding, on the first device, a signal comprising at least one active message and an idle traffic using 8B10B to form a stream of K28.5 characters; transmitting to the second device, via the first device, a signal comprising the encoded at least one active message and the idle traffic with an adjusted frequency; receiving, on the second device, the signal comprising the at least one active message and the encoded idle traffic from the first device; decoding, on the second device, the signal using 8B10B; splitting, via a traffic splitter on the second device, the signal into an ingress regular traffic and an ingress idle traffic; monitoring, on the second device, the ingress idle traffic to determine an amount of K28.5 characters; starting, on the second device, an error check if the amount of K28.5 characters is above a threshold value; generating, on the second device, a count-up or count-down signal via an up/down counter; generating, on the second device, a calibration message comprising a calibration feedback traffic from the up/down counter; merging, on the second device, the calibration message with the at least one active message to form a feedback message; encoding, on the second device, the feedback message using 8B10B; transmitting, via the second device, the feedback message to the first device; and repeating preceding steps for a plurality of sample intervals, thereby reducing a probability of data sampling failure for high speed asynchronous serial interfaces.

In some cases, the method for clock synchronization is started and/or ended with user intervention.

One embodiment of the method for clock synchronization further comprises ending the method when the clock frequency achieves an equilibrium state.

Another embodiment of the method for clock synchronization further comprises pausing the method when there is an insufficient bandwidth to support both the at least one active message and the idle traffic.

Yet another embodiment of the method for clock synchronization further comprises ending, on the second device, an error check if active traffic is detected. In some cases, the method for clock synchronization further comprises restarting the error check once the amount of K28.5 characters is above a threshold value.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 4C is a diagram of clock drift across periods according to the principles of the system and method of clock synchronization for use in high speed asynchronous serial interfaces of the present disclosure.

FIG. 5B is a flowchart of one embodiment of a method of clock synchronization for use in high speed asynchronous serial interfaces according to the principles of the present disclosure.

DETAILED DESCRIPTION OF THE DISCLOSURE

One goal of the system or method of the present disclosure is to ensure that nodes (e.g., device #1 and device #2) are in synchronization with each other so that data crossing a physical layer is preserved to the greatest extent possible. In a typical communication system, data loss is almost unavoidable, and as such there is a need to reduce data loss as much as possible. In extreme cases where data loss occurs, data will be retransmitted with instructions from the transport layer (see, FIG. 1). To maintain the physical layer (e.g., minimize data loss), calibration of the physical layer for the device is required from time to time. This calibration can be done offline in the manufacturing lab or on-line without bringing the physical layer device back to the manufacturer.

It is understood that a lot of computing equipment is operating in remote or critical areas such that replacement and calibration in a lab is impossible. The devices used in these fields require on-line calibration (i.e., automatically calibrating a device whenever it is not in use). One embodiment of the system and method of clock synchronization of the present disclosure provides for automatic, on-line calibration of network clocks to reduce the probability of data sampling failure for high speed asynchronous serial interfaces. Alternatively, in one embodiment, a user may start the process during certain period of time when the communication channel is under maintenance. During this period of time, a user can start the calibration and the calibration will run through without any pause because the communication channel is all IDLE traffic.

In one embodiment, real time adaptive clock trimming is used to maintain the difference between a receive clock and a transmitter clock to be within an acceptable range so that the probability of data failure will be negligible. In certain embodiments, on-line calibration does not require the communication equipment to be off-line before the calibration can be applied.

Figure 1:
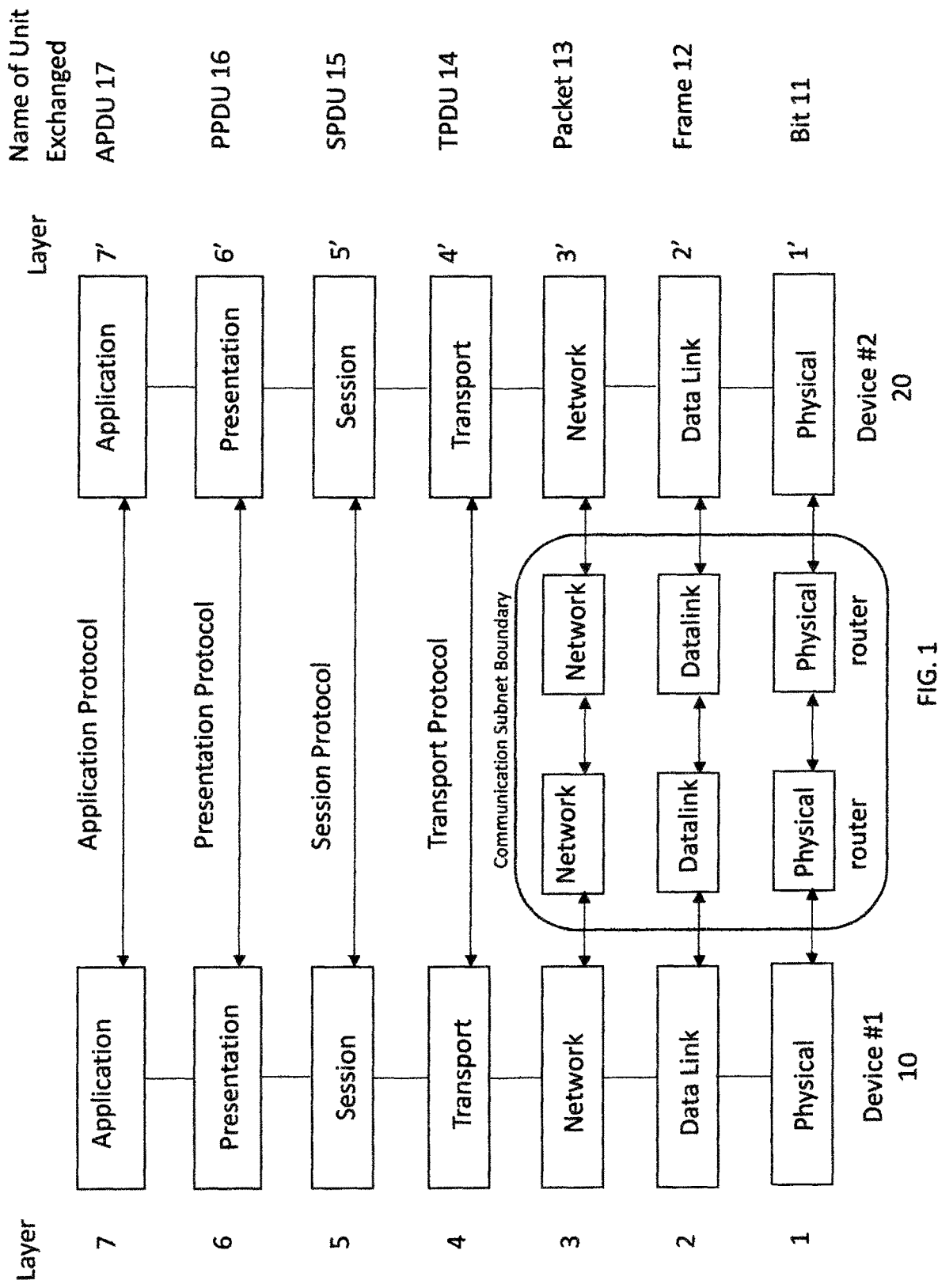
FIG. 1 shows a communication network for one embodiment of a system and method of clock synchronization for use in high speed asynchronous serial interfaces according to the principles of the present disclosure.

Referring to FIG. 1, a communication network for one embodiment of a system and method of clock synchronization for use in high speed asynchronous serial interfaces according to the principles of the present disclosure is shown. In the diagram, device #1 talks to device #2 via seven network layers. As used herein, device and node will be used interchangeably.

The layers shown in FIG. 1 include the application layer 7, 7'; the presentation layer 6, 6'; the session layer 5, 5'; the transport layer 4, 4'; the network layer 3, 3'; the data link layer 2, 2'; and the physical layer 1, 1'. For each layer, a unit of information is exchanged. The units of information are an application protocol data unit (APDU) 17, a presentation protocol data unit (PPDU) 16, a session protocol data unit (SPDU) 15, a transport protocol data unit (TPDU) 14, a packet 13, a frame 12, and a bit 11, respectively.

Still referring to FIG. 1, a message, such as a voice call from device #1 10, must go to the Application layer 7' of device #1 20. Virtually, each network layer talks to each other layer between the two nodes (10, 20). Ultimately, the processed message sent from device #1 is presented to the bottom layer, or physical layer of device #2 1'. In the physical layer, the two devices are typically connected to each other physically, via cables or the like.

Figure 2A:
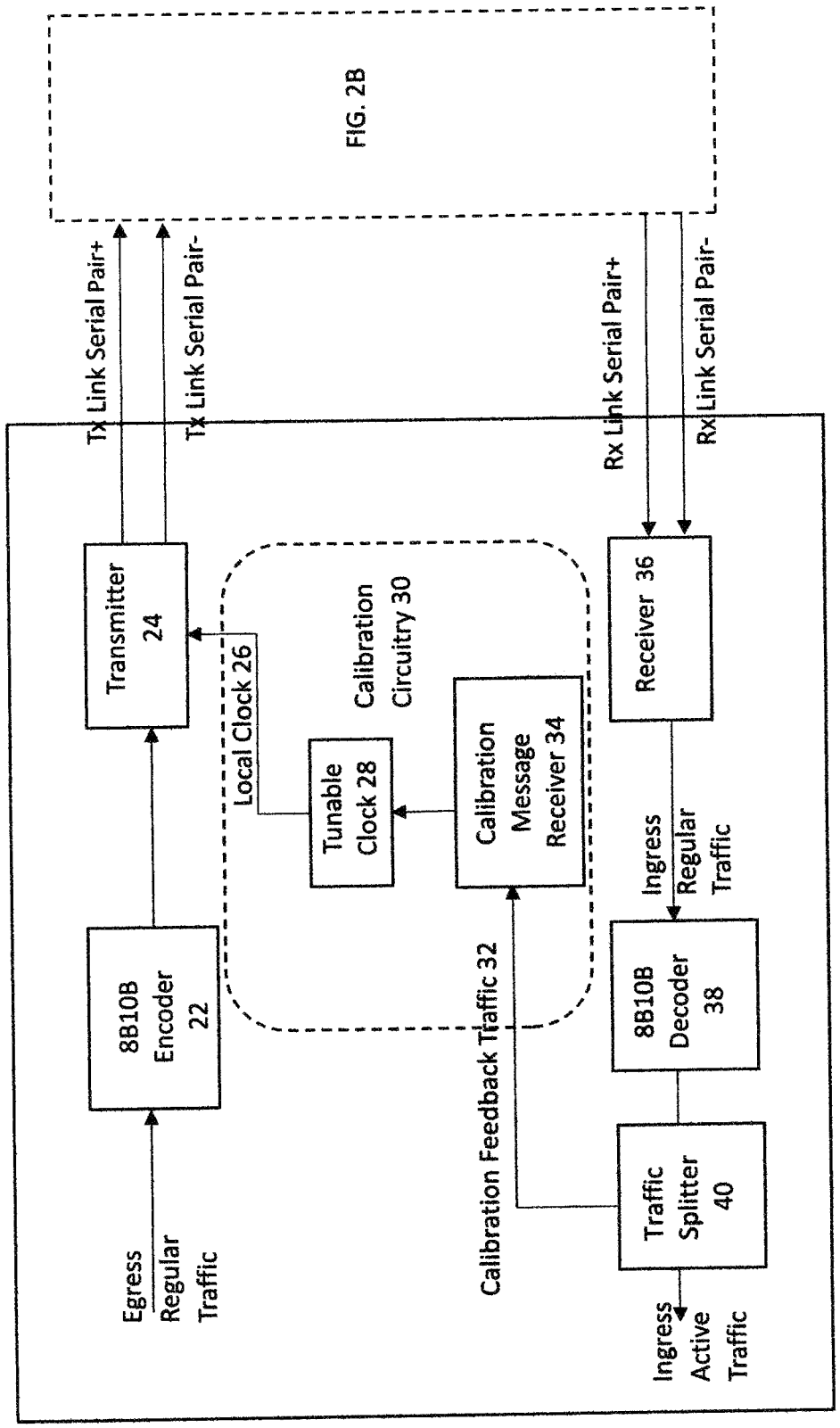
FIG. 2A and FIG. 2B show a physical layer of a communication network for one embodiment of a system and method of clock synchronization for use in high speed asynchronous serial interfaces according to the principles of the present disclosure.
Figure 2B:
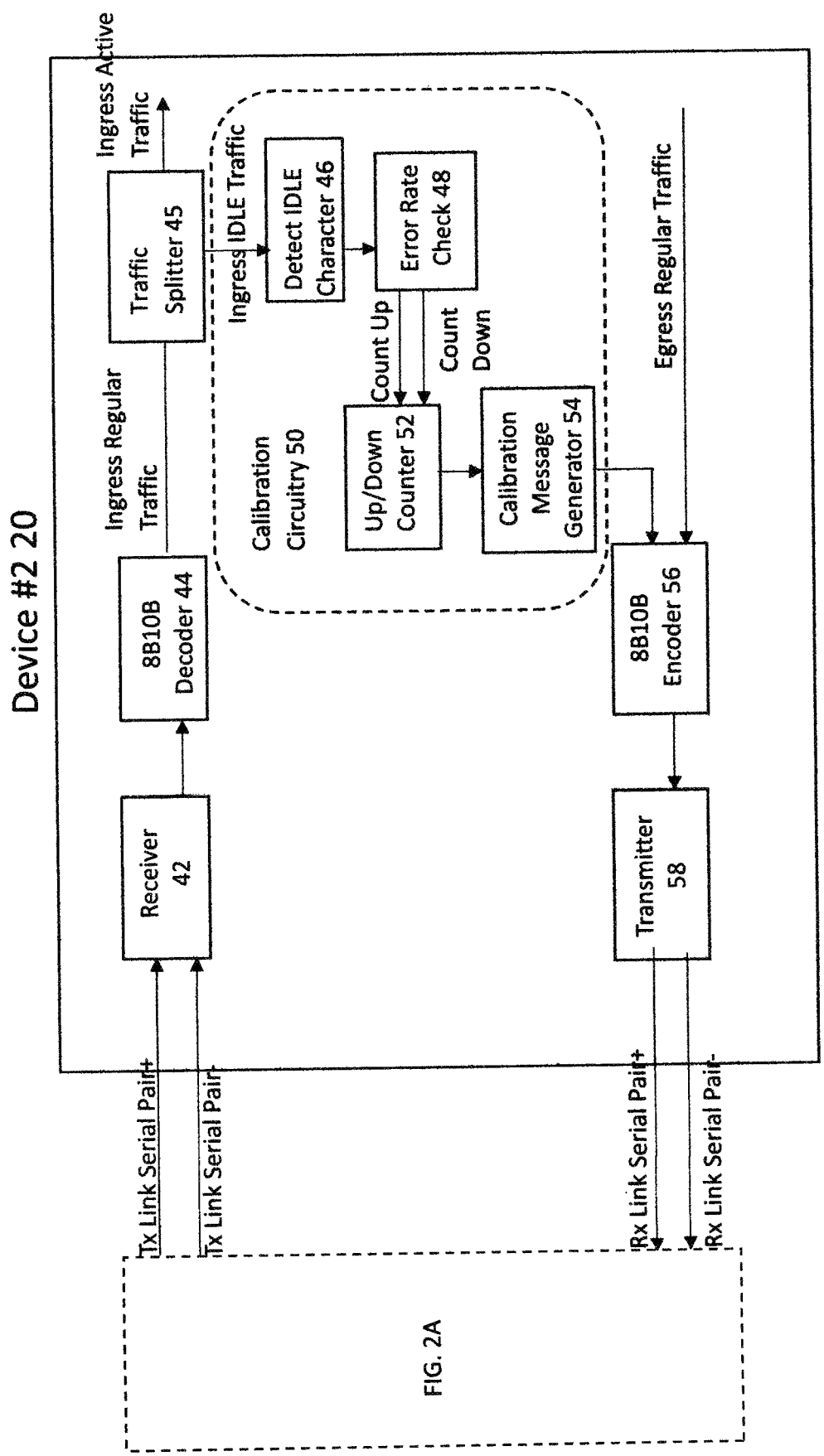

Referring to FIG. 2A and FIG. 2B, a physical layer of a communication network for one embodiment of a system and method of clock synchronization for use in high speed asynchronous serial interfaces according to the principles of the present disclosure is shown. More specifically, a device according to the principles of the present disclosure (device #1 FIG. 2A or device #2 FIG. 2B) is at a bottom layer, or physical layer of the communication system. As used herein, Ingress Traffic comprises Ingress Active Traffic+Ingress Idle Traffic+Ingress Calibration Traffic; Ingress Regular Traffic=Ingress Active Traffic+Ingress Idle Traffic; and Egress Regular Traffic=Egress Active Traffic+Egress Idle Traffic.

Still referring to FIG. 2A, transmit serial pairs and receive serial pairs communicatively connect device #1 10 in FIG. 2A to device #2 20 in FIG. 2B. Egress regular traffic is passed through an 8B10B encoder 22 to a transmitter 24 to transmit signals from device #1 to device #2 (not shown).

Ingress regular traffic from device #2 (not shown) is received by a receiver 36 in device #1 and is passed through a 8B10B decoder 38 and onto a traffic splitter 40. The traffic splitter 40 splits the signal into calibration feedback traffic 32 and ingress active traffic. The feedback traffic, used for calibration, is only from device to device and this feedback, or calibration feedback traffic, is mixed with regular traffic.

For both the transmitter and the receiver, if the serial link does not have sufficient bandwidth to handle the calibration traffic in addition to the active traffic, the calibration traffic will be paused until adequate bandwidth is available. In certain embodiments, the 8B10B encoder 22 encodes all the data traffic, i.e., the active traffic and the idle traffic. The idle traffic, once 8B10B encoded, becomes a stream of K28.5 idle characters. Ideally, the samples of idle character K28.5 have an equal chance to fall into two successive sample periods N and N+1 (see, e.g., FIG. 4). The 8B10B decoder 38 will decode both the regular traffic and the calibration traffic, and split the calibration traffic 32 off to the calibration message receiver 34. In certain embodiments of the present disclosure, calibration circuitry 30 comprises a calibration message receiver 34 and a tunable clock 28. One embodiment of the tunable clock has a tunable clock oscillator plus a charge pump. In certain embodiments, the charge pump is an electronic integrator which accumulates voltages resulting from small calibration steps.

Referring to FIG. 2B, transmit serial pairs and receive serial pairs communicatively connect device #1 10 in FIG. 2A to device #2 20 in FIG. 2B. Ingress regular traffic from device #1 (not shown) is received by a receiver 42 of device #2 and is passed through a 8B10B decoder 44. The ingress regular traffic is passed through a traffic splitter 45 that splits the signal into ingress idle traffic 32 and ingress active traffic.

In certain embodiments, the self-calibration process starts as long as the number of 8B10B IDLE characters is greater than N. This is detected in the idle character detection block 46. This detection block determines when the error check block 48 should start and when is should end so a starting boundary and an ending boundary for the collection of the K28.5 IDLE characters can be set. This error rate check block 48 detects the error by sampling the K28.5 IDLE characters and generates a count-up and/or count-down: 1. If the IDLE sample is generated below the "threshold" (i.e., the clock edge), the monitor circuitry will generate a count-down pulse; and 2. If the IDLE sample is generated above the "threshold" (i.e., the clock edge), the monitor circuitry will generate a count-up pulse. These error counters offer an up/down direction for clock adjustment to the clock in device #1 to provide for synchronization between the two devices. The counters capture the positive and negative transition of the receive signals.

Still referring to FIG. 2B, egress regular traffic is passed through an 8B10B encoder 56 to a transmitter 58 to transmit signals from device #2 to device #1 (not shown). As with device #1, for both the transmitter and the receiver, if the serial link does not have sufficient bandwidth to handle the calibration traffic in addition to the active traffic, the calibration traffic will be paused until adequate bandwidth is available.

In certain embodiments, it is not necessary to worry about the hysteresis for the counter 52, as any errors due to hysteresis will be taken care of over the long run. As used herein, a long run means that the adaptive process will eventually reach the equilibrium state within some number of iterations (i.e., clock cycles). The adaptive process is similar to inventor's previous work on a multi-stage multidimensional switch. To reach an equilibrium state some number of iterations are required, because of the nature of the up/down counter operation. Every time the counter is counted up or down once, a relatively very small electric charge to the charge pump is added or subtracted. Eventually, the charge pump will reach a state such that adding or subtracting charge will be fewer and fewer (but may not completely stop). This state is called the equilibrium state. This also means that two successive sample intervals are almost identical. This is also called a nearly uniform probability distribution. At equilibrium state, the calibration voltage will be oscillating about the ideal position with pre-defined voltage range.

The number of iterations needed for synchronization is based on how big the initial error is, and how often the error occurs. In some cases, the error is caused by various operation conditions such as environmental changes (temperature, pressure, aging, etc.). In certain embodiments, there is yet another check on the error rate, where if the error rate is zero, the adjustment stops.

Time-wise, a clock cycle is defined as the inverse of the clock frequency, which is usually about 250 MHz or above. The clock cycle period is therefore about 4 ns or less. This amount of calibration run time is negligible, when a node/device is in a relatively stable condition.

Still referring to FIG. 2B, the calibration message generator block 54 generates a special message to tell device #1 what to do. In some cases, the clock adjustment information is sent to the link partner (e.g., device #1 in this case), and it extracts the adjustment info and passes it to a tunable phase lock loop (PLL) to provide for the clock in device #1 to be adjusted. A PLL is a control system that generates an output signal whose phase is related to the phase of an input signal. A clock is generated by inputting a voltage representing the clock frequency to a voltage controlled oscillator (VCO).

In certain embodiments of the system and method of clock synchronization for use in high speed asynchronous serial interfaces, a clock monitor block monitors a local clock to make sure it is within a certain range (e.g., +/−100 ppm). There, the "good" device (e.g., device #2 in this example) will be the device to send out adjustment information.

Figure 3:
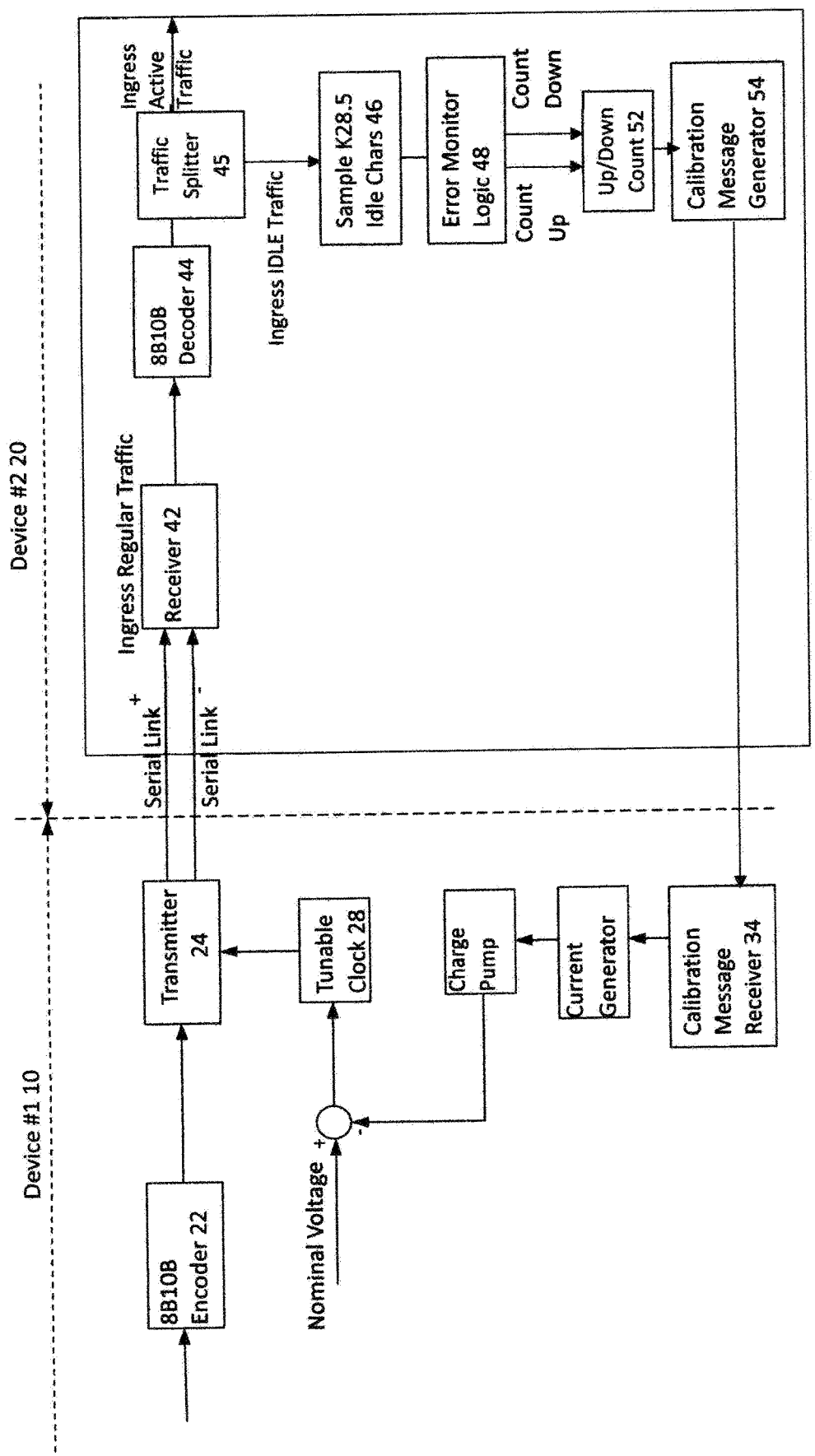
FIG. 3 shows a physical layer of a communication network for one embodiment of a system and method of clock synchronization for use in high speed asynchronous serial interfaces according to the principles of the present disclosure.

Referring to FIG. 3, a physical layer of a communication network for one embodiment of a system and method of clock synchronization for use in high speed asynchronous serial interfaces according to the principles of the present disclosure is shown. More specifically, this figure provides additional detail for the calibration step between device #1 and device #2 shown in FIG. 2A and FIG. 2B. In device #2 20, in certain embodiments the self-calibration process starts as long as the number of 8B10B IDLE characters is greater than N, which is detected in the idle character detection block 46. This detection block ensures when the error check block 48 should start and when is should end so a starting boundary and an ending boundary for the collection of the K28.5 IDLE characters can be set. This error check block 48 detects the error by sampling the K28.5 IDLE characters and generates a count-up and/or count-down signal. The calibration message generator 54 then sends a message to device #1 10 via the calibration message receiver 34 containing the count-up or count-down information.

In device #1 10, one embodiment of the tunable clock circuitry has a tunable clock oscillator plus a conventional charge pump. In certain embodiments, the charge pump is an electronic integrator which accumulates voltages resulting from small calibration voltages. The frequency is adjusted via a clock PLL with a charge pump, where a digital signal is provided to the charge pump, the charge pump integrates the digital input, and then outputs the analog signal to the clock PLL. The output is the nominal value+varying delta (increment+decrement) as shown, for example, in FIG. 3. When device #1 receives the calibration message, the calibration message tunes the frequency of the PLL accordingly to go fast or go slow (up/down). In certain embodiments, the adjusted local clock is used for the transmitter in device #1.

In one embodiment, the clock is about 250 MHz and the transmitter and the receiver is in the same chip. It is important though to ensure that 250 MHz clock on both sides are synchronized. In some cases, the period of 250 MHz is divided into four phases. In certain embodiments, the rate of clock adjustment does not have to be the same as that of the operating clock. For example, if the operating clock is running at 250 MHz, the clock adjustment step does not have to be at 250 MHz. The adjustment could be averaged out over a number of samples. In one example, the clock frequency is tuned once every 100 samples. In this case, the tuning only occurs at 2.5 MHz. The noise in the system will then be negligible. This will slow down the convergence to the equilibrium, from possibly microsecond to mini-second, but it is not going to be noticed by the Layer 3 and above (See, FIG. 1) in a real system.

Figure 4A:
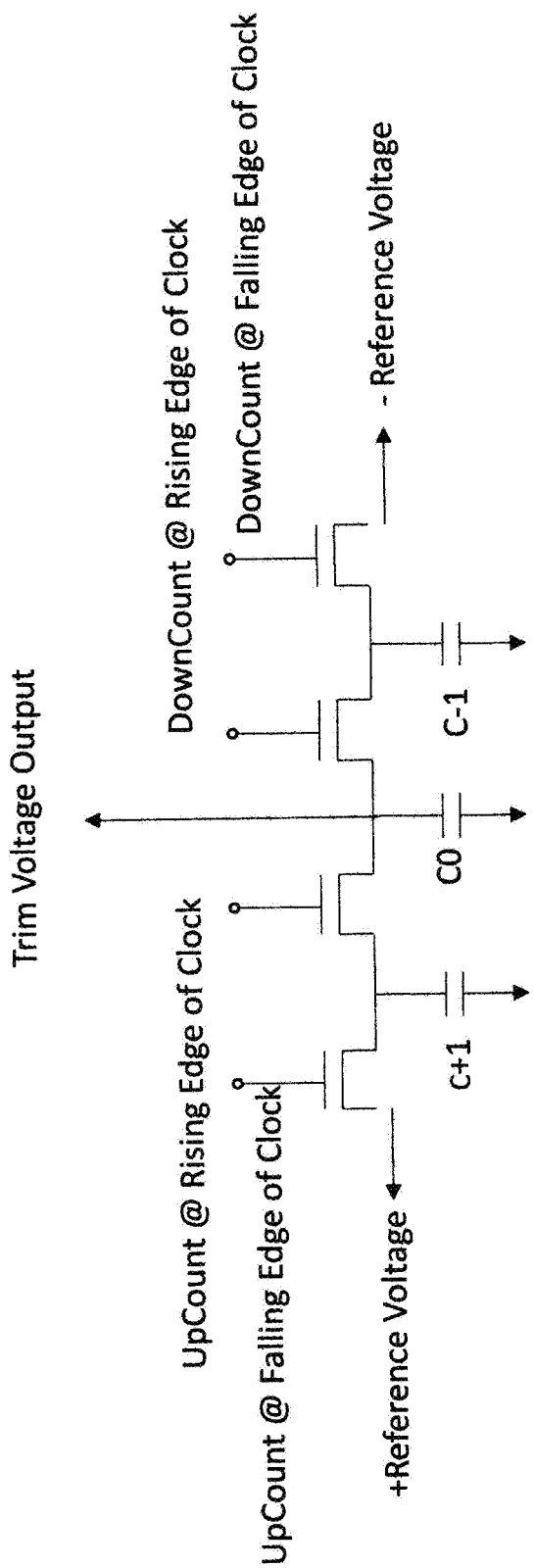
FIG. 4A is a conceptual diagram of one embodiment of a trim circuit using a charge pump according to the principles of the system and method of clock synchronization for use in high speed asynchronous serial interfaces of the present disclosure.
Figure 4B:
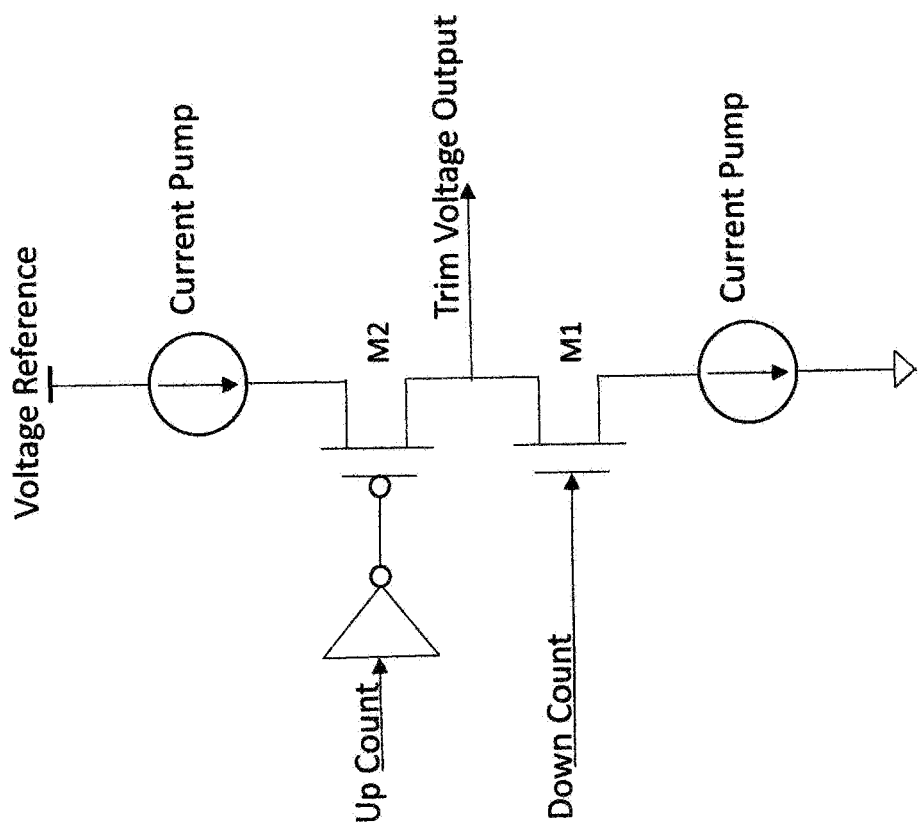
FIG. 4B is a conceptual diagram of one embodiment of a trim circuit using a charge pump according to the principles of the system and method of clock synchronization for use in high speed asynchronous serial interfaces of the present disclosure.

Referring to FIG. 4A, a conceptual diagram of one embodiment of a trim circuit using a charge pump according to the principles of the system and method of clock synchronization for use in high speed asynchronous serial interfaces of the present disclosure is shown. Referring to FIG. 4B, a conceptual diagram of one embodiment of a trim circuit using a charge pump according to the principles of the system and method of clock synchronization for use in high speed asynchronous serial interfaces of the present disclosure is shown.

Referring to FIG. 4C, a diagram of clock drift across periods according to the principles of the system and method of clock synchronization for use in high speed asynchronous serial interfaces of the present disclosure is shown. More specifically, the system logic samples the IDLE character flow based on the clock edge. In the front end data recovery block of a data receiver, the data sample edge could be either rising edge (clock phase degree 0) or falling edge (clock phase degree 180) or both rising edge (clock phase degree 0) and failing edge (clock phase degree 180) and between rising edge and falling edge (clock phase degree 90 and clock phase degree 270). In one embodiment, the sample will be made at the clock edge N (i.e., every clock edge) also referred to as the threshold. The clock edge keeps drifting for various reasons with respect to the ideal position. Reasons are: aging, temperature change and operation environmental change, or the like. If a sample is generated below the clock threshold, the count DOWN pulse is generated. If a sample is generated above the clock threshold, the count UP pulse is generated. With this approach, one need not worry about the clock hysteresis. Any errors due to the clock hysteresis will be taken care of over the long run.

One embodiment of the system and method of clock synchronization for use in high speed asynchronous serial interfaces forces the sample clock edges to be nearly identical or achieve a nearly uniform probability distribution using 8B10B encoding and error check logic, which is, in essence, bin collecting of samples of incoming encoded 8B10B IDLE characters.

One embodiment of the system and method of clock synchronization uses a prediction model that allows the system to keep working without interruption during calibration. There are existing adaptive clock estimation and synchronization approaches that use adaptive filtering, but they require a complex mathematical model to predict when the clock should begin the synchronization process. Prior systems with a complex mathematical model require digital signal processing and thus is very difficult implement it in analog circuitry.

One embodiment of the present disclosure simplifies the prediction logic and does not require a mathematical model prediction. Instead, the present disclosure uses the DC balance of 8B10B encoding as a prediction model. During the 8B10B transmission, the adaptive filter process is accomplished by adaptively adjusting the frequency for the clock, and drives the statistical properties of the frequency to nearly uniform probability distribution.

In certain embodiments of the method and system for clock synchronization for high speed asynchronous serial interfaces of the present disclosure, the closed adaptive filtering system is a stable system. An adaptive filter system is, in essence, a state-space system. The adaptive filter system of the preset disclosure can be analyzed, for example, by a z-transform as illustrated in inventor's previous work on Frequency-Domain Analysis of A/D converter nonlinearity. There, it shows an adaptive filter system is a stable system and is also referred to as a converging system, which iteratively reduces the LMS error and ultimately converges to the ideal position. The system is a first-order low-pass (LP) filter characterized in the Z transfer domain with all the poles located inside the unit circle. The previous work demonstrates that a self-trim algorithm can drive a calibration error to zero (the system can converge to equilibrium), and how quickly.

In accordance with the goals of the present disclosure, this approach requires an active, real-time handshake between each node and its "leader" node. Due to the nature of adaptive filtering this interaction could be very slow and irregular. The self-adaptive model of the present disclosure provides that over the long run, the samples that fall into two successive intervals (i.e., "thresholds") conform to the uniform probability distribution. Based on this model, the relationship between the clock precision and synchronization time is induced and the synchronization process will begin and eventually force the intervals of successive "thresholds" to become equal.

In certain embodiments, by operating the system to reduce the error a little bit a time, the system and method ultimately achieves sampling thresholds that are in equilibrium bringing the sampling error for the data to a minimum. Importantly, this approach can also be implemented in the analog domain.

Figure 5A:
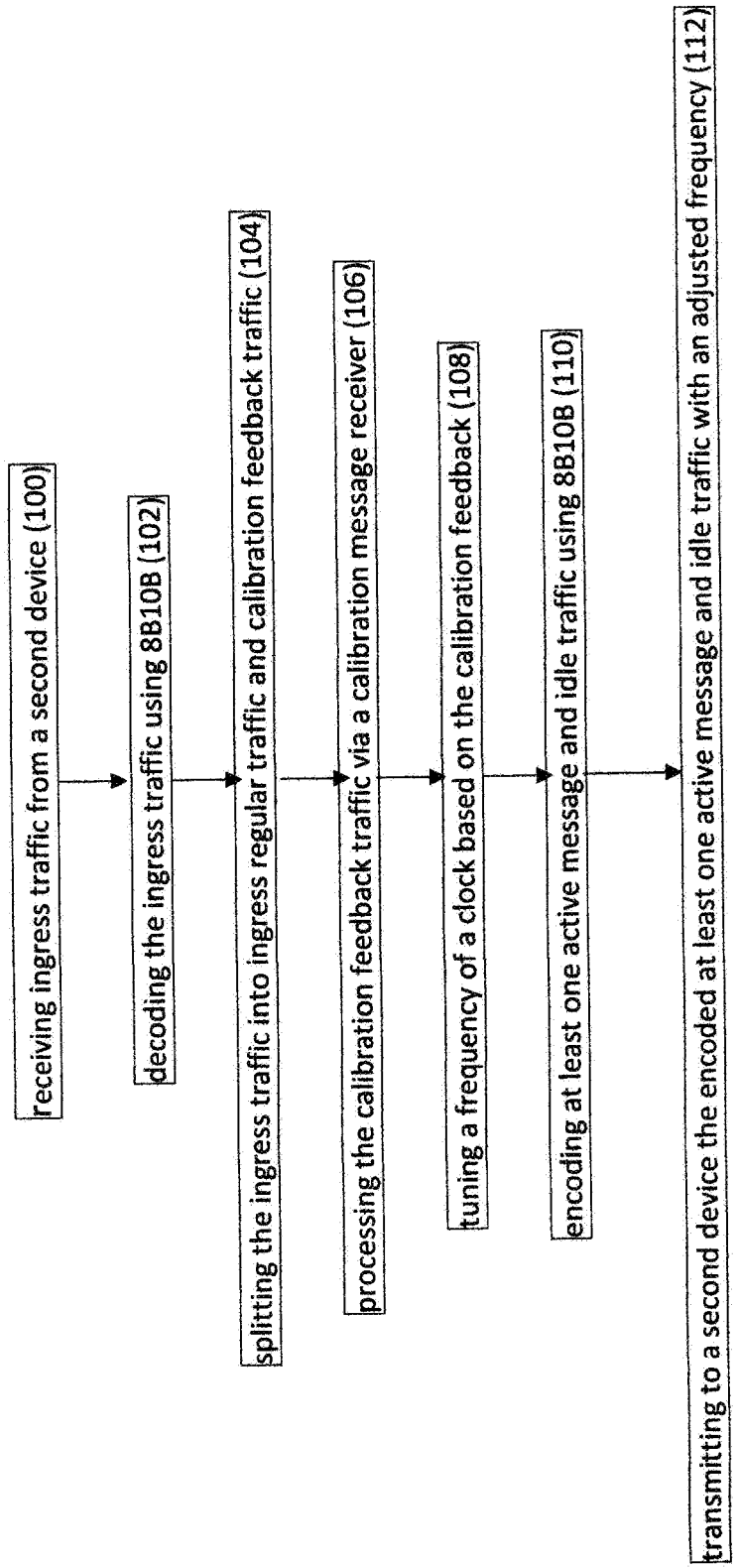
FIG. 5A is a flowchart of one embodiment of a method of clock synchronization for use in high speed asynchronous serial interfaces according to the principles of the present disclosure.

Referring to FIG. 5A, a flowchart of one embodiment of a method of clock synchronization for use in high speed asynchronous serial interfaces according to the principles of the present disclosure is shown. More specifically, on a first device, receiving ingress traffic from a second device (100) and decoding the ingress traffic using 8B10B (102). Next, the ingress traffic is split into ingress regular traffic and calibration feedback traffic (104). A calibration message receiver (106) processes the calibration feedback traffic. A frequency of a clock is then tuned based on the calibration feedback (108). At least one active message and idle traffic is then encoded on the first device using 8B10B (110) and the encoded at least one active message and idle traffic is transmitted to a second device with an adjusted frequency (112).

Referring to FIG. 5B, a flowchart of one embodiment of a method of clock synchronization for use in high speed asynchronous serial interfaces according to the principles of the present disclosure is shown. More specifically, on a second device a signal comprising at least one active message and encoded idle traffic is received from a first device (200) and the signal is decoded using 8B10B (202). The signal is the split into ingress regular traffic and ingress idle traffic (204) using a traffic splitter on the second device. The ingress idle traffic is monitored to determine an amount of K28.5 characters (206) and an error check is started if the amount of K28.5 characters is above a threshold value (208). A count-up or count-down signal is generated via an up/down counter (210) and a calibration message comprising calibration feedback traffic from the up/down counter is generated (212). The calibration message is merged with the at least one active message to form a feedback message (214). The feedback message is encoded using 8B10B (216) and transmitted to the first device (218). The steps are repeated for a plurality of sample intervals, thereby reducing a probability of data sampling failure for high speed asynchronous serial interfaces.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the disclosure may be implemented as computer software, which may be supplied on a storage medium or via a transmission medium such as a local-area network or a wide-area network, such as the Internet. It is to be further understood that, because some of the constituent system components and method steps depicted in the accompanying figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

It is to be understood that the present disclosure can be implemented in various forms of hardware, software, firmware, special purpose processes, or a combination thereof. In one embodiment, the present disclosure can be implemented in software as an application program tangible embodied on a computer readable program storage device. The application program can be uploaded to, and executed by, a machine comprising any suitable architecture.

While various embodiments of the present disclosure have been described in detail, it is apparent that various modifications and alterations of those embodiments will occur to and be readily apparent to those skilled in the art. However, it is to be expressly understood that such modifications and alterations are within the scope and spirit of the present disclosure, as set forth in the appended claims. Further, the disclosure(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method for clock synchronization for use in high speed asynchronous serial interfaces, comprising:
   on a first device:
   receiving an ingress traffic from a second device;
   decoding the ingress traffic using 8B10B;
   splitting, via a traffic splitter, the ingress traffic in to an ingress regular traffic and a calibration feedback traffic;
   processing the calibration feedback traffic via a calibration message receiver;
   tuning a clock frequency based on the calibration feedback;
   encoding a signal comprising at least one active message and an idle traffic using 8B10B to form a stream of K28.5 characters;
   transmitting to the second device a signal comprising the encoded at least one active message and the idle traffic with an adjusted frequency; and
   repeating preceding for a plurality of sample intervals, thereby reducing a probability of data sampling failure for high speed asynchronous serial interfaces.

2. The method for clock synchronization according of claim 1, wherein the method is performed without user intervention.

3. The method for clock synchronization according of claim 1, further comprising ending the method when the clock frequency achieves an equilibrium state.

4. The method for clock synchronization according of claim 3, wherein the equilibrium state occurs when successive sample intervals are almost identical conforming to a nearly uniform probability distribution.

5. The method for clock synchronization according of claim 1, further comprising pausing the method when there is an insufficient bandwidth to support both the at least one active message and the idle traffic.

6. The method for clock synchronization according of claim 1, wherein a clock frequency is adjusted to go fast or to go slow (up/down) via a clock phase locked loop (PLL) with a charge pump.

7. The method for clock synchronization according of claim 6, wherein the charge pump is an electronic integrator which accumulates voltages resulting from small calibration steps.

8. A method for clock synchronization for use in high speed asynchronous serial interfaces, comprising:
   on a second device:
   receiving a signal from a first device comprising at least one active message and encoded idle traffic from the first device;
   decoding the signal using 8B10B;
   splitting, via a traffic splitter, the signal into an ingress regular traffic and an ingress idle traffic;
   monitoring the ingress idle traffic to determine an amount of K28.5 characters;
   starting an error check if the amount of K28.5 characters is above a threshold value;
   generating a count-up or count-down signal via an up/down counter;
   generating a calibration message comprising a calibration feedback traffic from the up/down counter;
   merging the calibration message with the at least one active message to form a feedback message;
   encoding the feedback message using 8B10B;
   transmitting the feedback message to the first device; and
   repeating preceding steps for a plurality of sample intervals, thereby reducing a probability of data sampling failure for high speed asynchronous serial interfaces.

9. The method for clock synchronization according of claim 8, wherein the method is performed without user intervention.

10. The method for clock synchronization according of claim 8, further comprising ending the method when the clock frequency achieves an equilibrium state.

11. The method for clock synchronization according of claim 10, wherein the equilibrium state occurs when successive sample intervals are almost identical conforming to a nearly uniform probability distribution.

12. The method for clock synchronization according of claim 8, further comprising pausing the method when there is an insufficient bandwidth to support both the at least one active message and the idle traffic.

13. The method for clock synchronization according of claim 8, further comprising ending, on the second device, an error check if active traffic is detected.

14. The method for clock synchronization according of claim 13, further comprising restarting the error check once the amount of K28.5 characters is above a threshold value.

15. A method for clock synchronization for use in high speed asynchronous serial interfaces, comprising:
   receiving, on a first device, an ingress traffic from a second device;
   decoding, on the first device, the ingress traffic using 8B10B;
   splitting, via a traffic splitter on the first device, the ingress traffic into an ingress regular traffic and a calibration feedback traffic;
   processing, on the first device, the calibration feedback traffic via a calibration message receiver;
   tuning, on the first device, a clock frequency based on the calibration feedback traffic;

encoding, on the first device, a signal comprising at least one active message and an idle traffic using 8B10B to form a stream of K28.5 characters;

transmitting to the second device, via the first device, a signal comprising the encoded at least one active message and the idle traffic with an adjusted frequency;

receiving, on the second device, the signal comprising the at least one active message and the encoded idle traffic from the first device;

decoding, on the second device, the signal using 8B10B;

splitting, via a traffic splitter on the second device, the signal into an ingress regular traffic and an ingress idle traffic;

monitoring, on the second device, the ingress idle traffic to determine an amount of K28.5 characters;

starting, on the second device, an error check if the amount of K28.5 characters is above a threshold value;

generating, on the second device, a count-up or count-down signal via an up/down counter;

generating, on the second device, a calibration message comprising a calibration feedback traffic from the up/down counter;

merging, on the second device, the calibration message with the at least one active message to form a feedback message;

encoding, on the second device, the feedback message using 8B10B;

transmitting, via the second device, the feedback message to the first device; and repeating preceding steps for a plurality of sample intervals, thereby reducing a probability of data sampling failure for high speed asynchronous serial interfaces.

16. The method for clock synchronization according of claim 15, wherein the method is started and/or ended with user intervention.

17. The method for clock synchronization according of claim 15, further comprising ending the method when the clock frequency achieves an equilibrium state.

18. The method for clock synchronization according of claim 15, further comprising pausing the method when there is an insufficient bandwidth to support both the at least one active message and the idle traffic.

19. The method for clock synchronization according of claim 15, further comprising ending, on the second device, an error check if active traffic is detected.

20. The method for clock synchronization according of claim 19, further comprising restarting the error check once the amount of K28.5 characters is above a threshold value.

* * * * *